(12) United States Patent  
Ono

(10) Patent No.: US 9,168,917 B2
(45) Date of Patent: Oct. 27, 2015

(54) CONTROLLER FOR HYBRID VEHICLE

(71) Applicant: DENSO CORPORATION, Kariya, Aichi-pref. (JP)

(72) Inventor: Hiroaki Ono, Tokoname (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/021,397

(22) Filed: Sep. 9, 2013

(65) Prior Publication Data

US 2014/0100731 A1 Apr. 10, 2014

(30) Foreign Application Priority Data

Oct. 4, 2012 (JP) ................................. 2012-221945

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60W 20/00* | (2006.01) | |
| *B60W 10/08* | (2006.01) | |
| *B60W 10/30* | (2006.01) | |

(52) U.S. Cl.
CPC ............. *B60W 20/108* (2013.01); *B60W 10/08* (2013.01); *B60W 10/30* (2013.01); *B60W 2600/00* (2013.01); *B60W 2710/0688* (2013.01); *B60W 2710/088* (2013.01); *B60Y 2306/05* (2013.01); *B60Y 2400/89* (2013.01); *F01P 2050/24* (2013.01); *Y10S 903/93* (2013.01)

(58) Field of Classification Search
CPC ....... F01P 3/12; B60W 20/108; B60W 10/08; B60W 10/30

USPC .......................................................... 701/22
See application file for complete search history.

(56) References Cited

U.S. PATENT DOCUMENTS

2007/0035270 A1\* 2/2007 Kitamura et al. ............. 318/727
2012/0082871 A1\* 4/2012 Simonini et al. ............... 429/50

FOREIGN PATENT DOCUMENTS

| JP | 2005-199986 | | 7/2005 |
|---|---|---|---|
| JP | 2005199986 | * | 7/2005 |
| JP | 2008-5615 | | 1/2008 |
| JP | 2010-095191 | | 4/2010 |
| JP | 2010095191 | * | 4/2010 |
| JP | 2011-098628 | | 5/2011 |

OTHER PUBLICATIONS

Notification of Reason(s) for Refusal issued Feb. 12, 2015 in corresponding Japanese Application No. 2012-221945 with English-language translation.

\* cited by examiner

*Primary Examiner* — Maceeh Anwari
(74) *Attorney, Agent, or Firm* — Nixon & Vanderhye P.C.

(57) ABSTRACT

A cooling system circulates a coolant between an engine, an inverter and a radiator to cool the engine and the inverter. A driving mode of the vehicle can be changed between an EV-mode in which the vehicle is driven only by the motor and an HV-mode in which the vehicle is driven by at least one of the motor and the engine. When a driving mode is EV-mode, a coolant temperature is increased to cool the inverter. In the EV-mode, a vehicle is driven by motor only. When the inverter temperature is increased, the allowable current of the inverter can be increased and an allowable output of a motor can be increased.

8 Claims, 6 Drawing Sheets

FIG. 4

| | VEHICLE CONDITION | | CONDITION | | | PASSAGE-SWITCHING VALVE |
|---|---|---|---|---|---|---|
| | R/P | ENGINE | DRIVING MODE | ENGINE TEMP. | INVERTER TEMP. | |
| (a) | RUNNING | BEFORE WARMING-UP | EV-MODE | LOW (65°) | LOW (65°) | NORMAL |
| (b) | RUNNING | AFTER WARMING-UP | EV-MODE | HIGH (105°) | LOW (65°) | BYPASS |
| (c) | RUNNING | BEFORE WARMING-UP | HV-MODE | LOW (65°) | LOW (65°) | NORMAL |
| (d) | RUNNING | AFTER WARMING-UP | HV-MODE | HIGH (105°) | HIGH (105°) | NORMAL |
| (e) | PARKED | BEFORE WARMING-UP | — | LOW (65°) | LOW (65°) | BYPASS |
| (f) | PARKED | AFTER WARMING-UP | — | HIGH (105°) | HIGH (105°) | BYPASS |

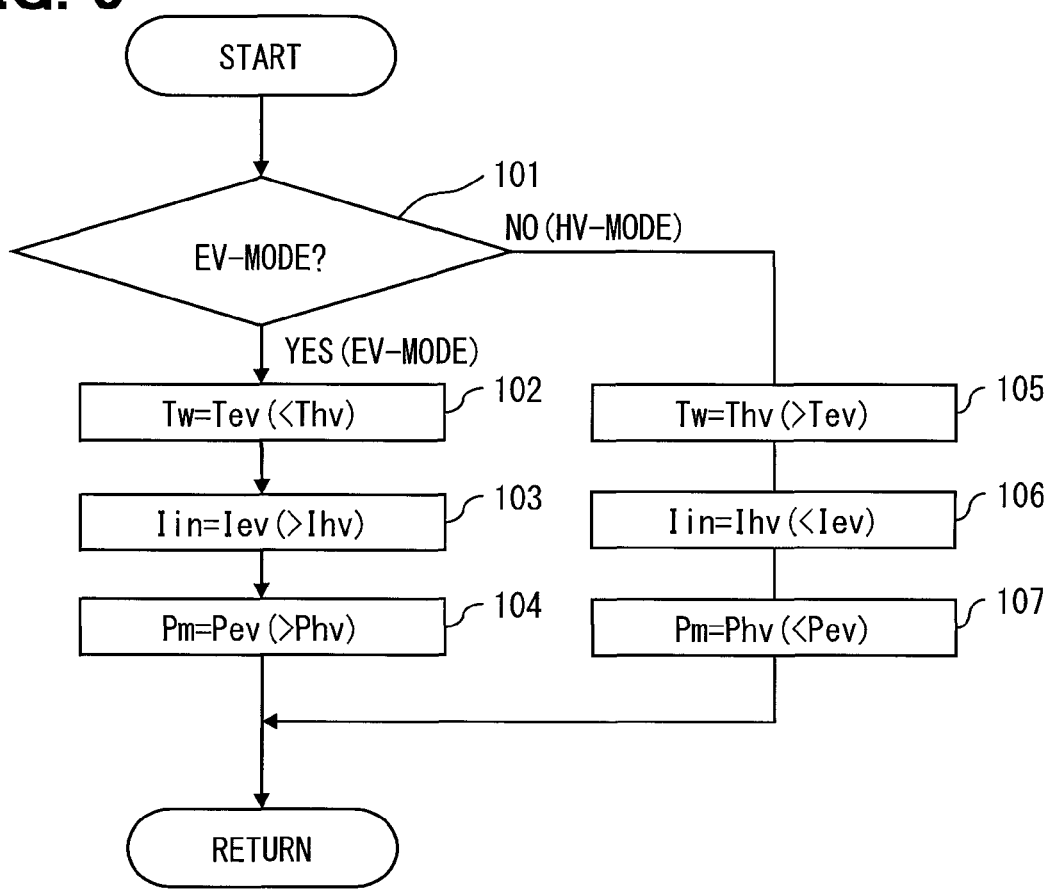

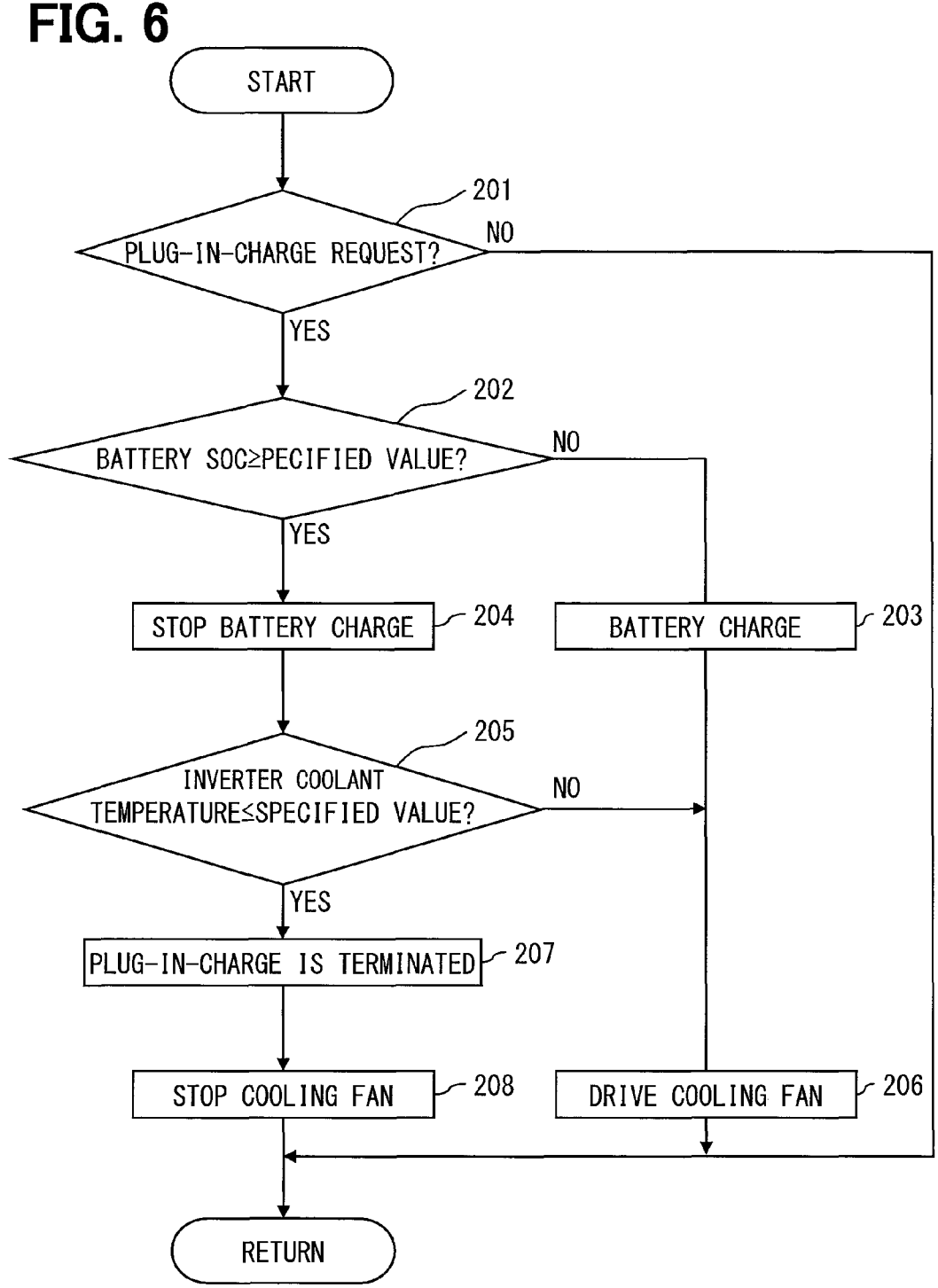

CONTROLLER FOR HYBRID VEHICLE

CROSS-REFERENCE TO RELATED APPLICATION

This application is based on Japanese Patent Application No. 2012-221945 filed on Oct. 4, 2012, the disclosure of which is incorporated herein by reference.

TECHNICAL FIELD

The present disclosure relates to a controller for a hybrid vehicle provided with an engine, a motor and an inverter.

BACKGROUND

A hybrid vehicle and an electric vehicle have been developed to reduce emission and improve fuel economy. In such a hybrid vehicle and an electric vehicle, the direct current voltage of a battery is changed into the alternating voltage by an inverter to drive a motor. JP-2008-5615A shows a system which avoids overheat of the inverter. In this system, the coolant is circulated between the inverter and the radiator. When the temperature of the inverter exceeds a predetermined threshold, the motor is controlled to reduce the output torque.

Since the hybrid vehicle has an engine and a motor, an engine cooling system and an inverter cooling system are necessary.

Moreover, a plug-in hybrid vehicle has been developed. In the plug-in hybrid vehicle, a motor driving period (EV mode) is longer than a normal hybrid vehicle. Thus, the motor should output higher power to improve the power performance in the EV mode. However, such a high power motor and inverter increase manufacturing cost of the vehicle.

SUMMARY

It is an object of the present disclosure to provide a controller for a hybrid vehicle, which can improve a power performance in an EV mode with small cooling system, a motor and an inverter.

A controller for a hybrid vehicle includes an engine and a motor for driving a vehicle; an inverter driving the motor; a battery supplying electric power to the motor through the inverter. The vehicle is a hybrid vehicle having a plug-in-charger for charging the battery from an external power source. A driving mode of the vehicle is changed between an EV-mode in which the vehicle is driven only by the motor and an HV-mode in which the vehicle is driven by at least one of the motor and the engine. The controller further includes a cooling system for circulating a coolant between the engine, the inverter and a radiator in order to cool the engine and the inverter. The controller further includes an allowable-current controller which varies an upper limit temperature of the coolant, an allowable current of the inverter, and an allowable output of the motor, according to the driving mode.

BRIEF DESCRIPTION OF THE DRAWINGS

The above and other objects, features and advantages of the present disclosure will become more apparent from the following detailed description made with reference to the accompanying drawings. In the drawings:

FIG. 4 is a chart for explaining a control method of a passage-switching valve

FIG. 5 is a flow chart showing a processing of allowable current switching control;

FIG. 6 is a flow chart showing a plug-in-charge control; and

DETAILED DESCRIPTION

Figure 1:
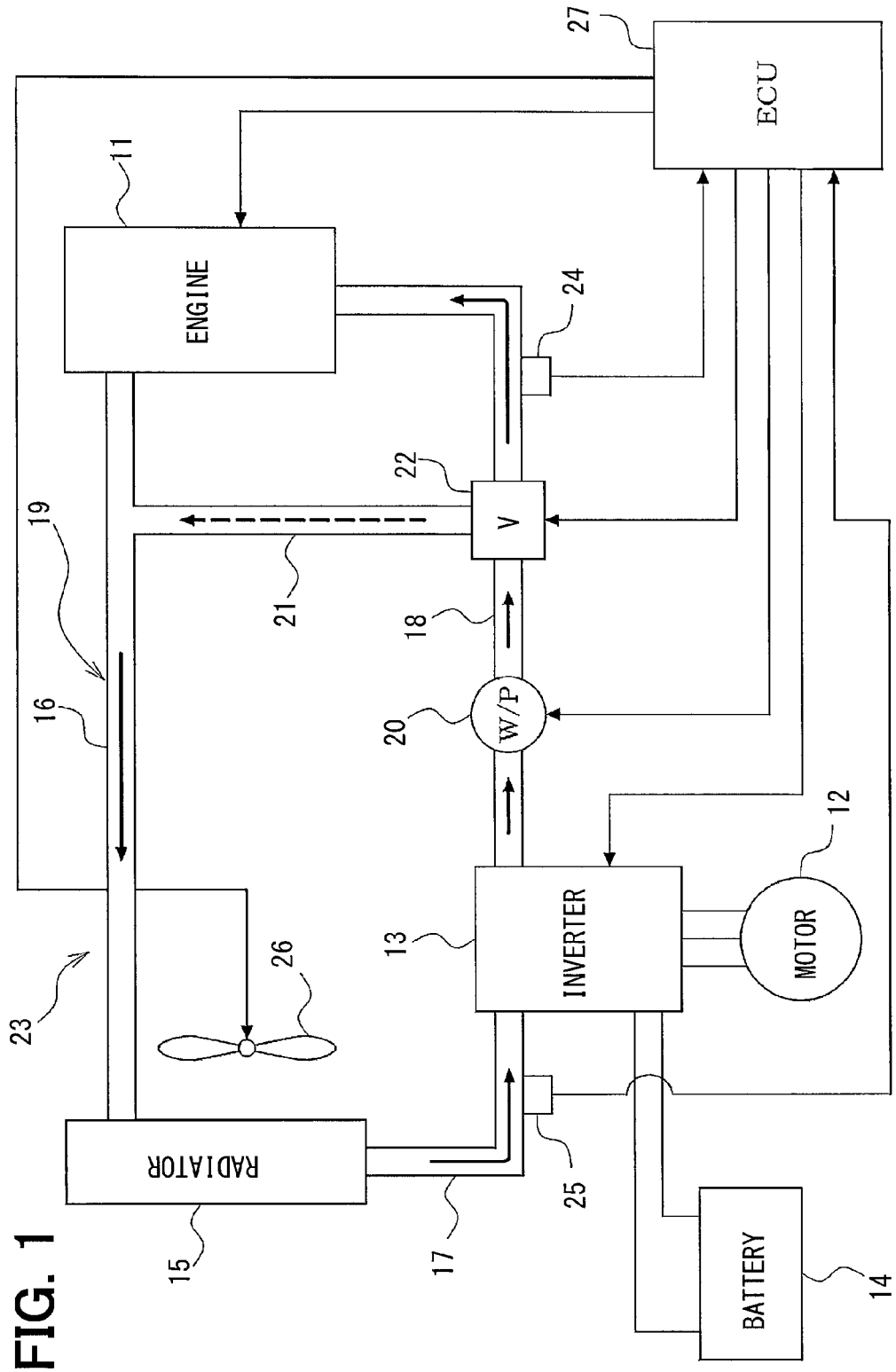
FIG. 1 is a schematic view showing a cooling system of a plug-in hybrid vehicle according to an embodiment.

An embodiment will be described hereinafter. First, a cooling system of a plug-in hybrid vehicle is explained based on FIG. 1. The vehicle is provided with an engine 11 and a motor 12. An inverter 13 driving the motor 12 is connected to a battery 14. The motor 12 receives electric power from the battery 14 through the inverter 13. In the present embodiment, the vehicle has a plug-in charge configuration in which an external power source (not shown) can be connected to the battery 14 so that the battery 14 is charged. Moreover, a switching element (for example, SiC-MOSFET) made from SiC (silicon carbide) is used to form a switching circuit of the inverter 13.

The engine 11 and the inverter 13 have a coolant passage (not shown). An exit of the coolant passage of the engine 11 is connected to an inlet of the radiator 16 through a first coolant pipe 16. An exit of the radiator 15 is connected to an inlet of the coolant passage of the inverter 13 through a second coolant pipe 17. An exit of the coolant passage of the inverter 13 is connected to an inlet of the coolant passage of the engine 11 through a third coolant pipe 18. Thereby, a coolant circulation circuit 19 is configured, in which the coolant flows through the first coolant pipe 16, the radiator 15, the second coolant pipe 17, the inverter 13, the third coolant pipe 18 and the engine 11. In the coolant circulation circuit 19, an electric water pump 20 is provided to circulate the coolant.

The coolant circulation circuit 19 is provided with a bypass passage 21 which bypasses the coolant passage of the engine 11. Each end of the bypass passage 21 is connected to the first coolant pipe 16 and the second coolant pipe 18. At an inlet portion of the bypass passage 18, a passage-switching valve 22 is provided. The passage-switching valve 22 switches between the coolant passage of the engine 11 and the bypass passage 21. The bypass passage 21 and the passage-switching valve 22 are arranged downstream of the water pump 20.

The coolant passage of the engine 11, the coolant passage of the inverter 13, the coolant pipes 16 to 18, the bypass passage 21 and the passage-switching valve 22 form an engine cooling system 23 for cooling the engine 11 and the inverter 13.

The third coolant pipe 18 is provided with a coolant temperature sensor 24 which detects the temperature of the engine coolant. The second coolant pipe 17 is provided with an inverter-temperature sensor 25 which detects the coolant temperature in the coolant passage of the inverter 13. A cooling fan 26 generating a cooling air is arranged at a vicinity of the radiator 15.

An ECU 27 has a microcomputer which reads various kinds of sensors, such as an accelerator sensor, a brake switch, and a speed sensor. The ECU 27 controls the engine 11, the motor 12, and the engine cooling system 23 (the water pump 20, the passage-switching valve 22, the cooling fan 26). The ECU 27 switches a vehicle driving mode between EV-mode and HV-mode. In the EV-mode, the vehicle is driven only by the motor 12. In the HV-mode, the vehicle is driven by the engine 11 and/or the motor 12.

The ECU 27 may be comprised of a hybrid ECU, an engine ECU, a motor ECU, and a cooling-system ECU.

Figure 2:
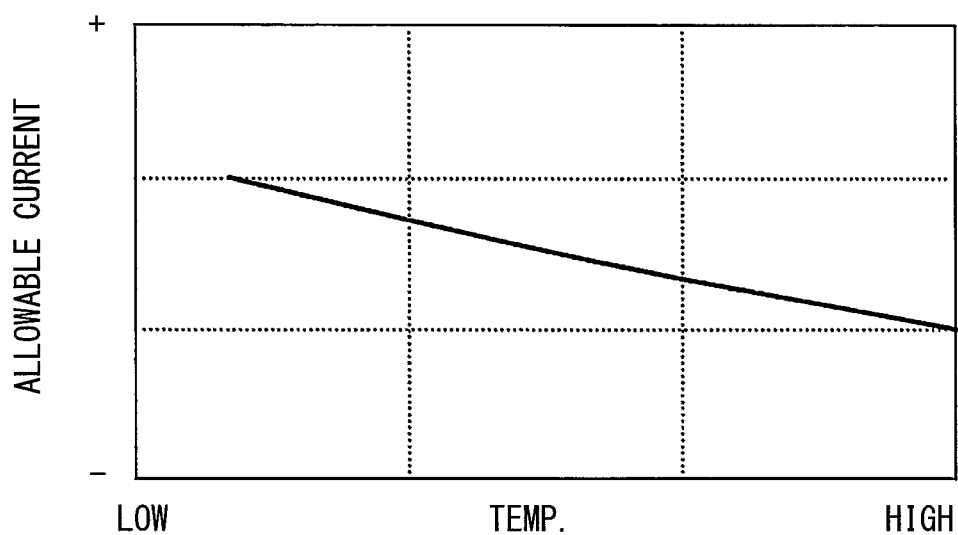
FIG. 2 is a chart for explaining a relationship between an inverter temperature and an allowable current.

In the EV mode, the engine 11 is not driven and the engine 11 generates no combustion heat. Thus, the coolant temperature can be reduced and the temperature of the inverter 13 can be also reduced. Generally, as shown in FIG. 2, an allowable current of the inverter 13 can be made larger as the switching element temperature becomes lower.

In view of the above, the ECU 27 executes an allowable-current-switching control shown in FIG. 5. According to the driving mode, the upper limit temperature of the coolant is varied and the allowable current of the inverter 13 is also varied.

Figure 3:
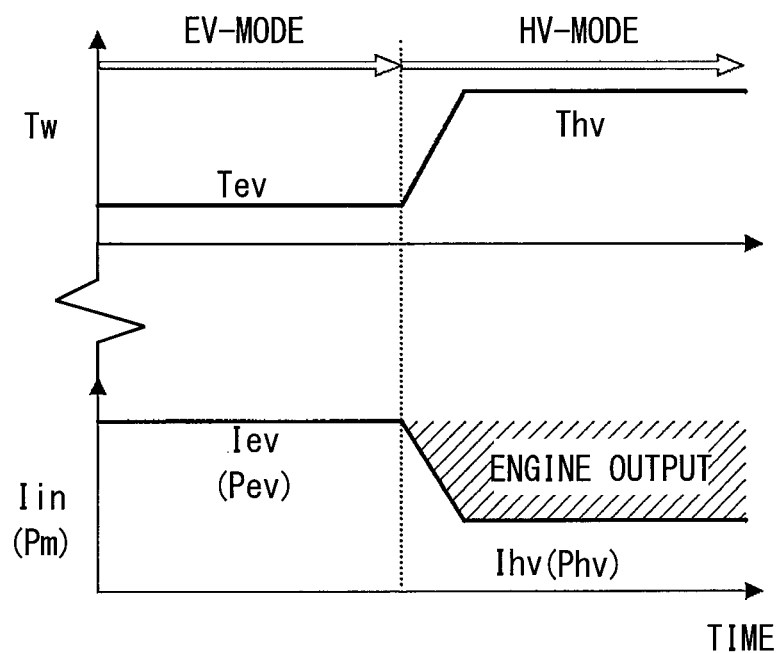
FIG. 3 is a time chart showing an allowable current switching control.

Specifically, as shown in FIG. 3, when the driving mode is EV-mode, the upper limit temperature "Tw" of the coolant is set to an upper limit temperature "Tev" (for example, 65° C.) for EV-mode. The upper limit temperature "Tev" for EV-mode is lower than an upper limit temperature "Thv" for HV-mode.

$$Tw=Tev(<Thv)$$

Furthermore, when the driving mode is EV-mode, the allowable current "Iin" of the inverter 13 is set to an allowable current "Iev" (for example, 230A) for EV mode. An allowable output "Pm" of the motor 12 is set to an allowable output "Pev" (for example, 70 kW) for EV-mode. The allowable current "Iev" for EV-mode is larger than the allowable current "Ihv" for HV-mode. The allowable output "Pev" for EV-mode is larger than the allowable output "Phv" for HV-mode.

$$Iin=Iev(>Ihv)$$

$$Pm=Pev(>Phv)$$

When the driving mode is HV-mode, the upper limit temperature "Tw" of the coolant is set to an upper limit temperature "Thv" (for example, 105° C.) for HV-mode. The upper limit temperature "Thv" for HV-mode is higher than an upper limit temperature "Tev" for EV-mode.

$$Tw=Thv(>Tev)$$

Furthermore, when the driving mode is HV-mode, the allowable current "Iin" of the inverter 13 is set to an allowable current "Ihv" (for example, 170A) for HV-mode. An allowable output "Pm" of the motor 12 is set to an allowable output "Phv" (for example, 45 kW) for HV-mode. The allowable current "Ihv" for HV-mode is smaller than the allowable current "Iev" for EV-mode. The allowable output "Phv" for HV-mode is smaller than the allowable output "Pev" for EV-mode.

$$Iin=Ihv(<Iev)$$

$$Pm=Phv(<Pev)$$

According to the present embodiment, the ECU 27 executes a plug-in-charge control shown in FIG. 6. While the plug-in-charge control is executed, the cooling fan 26 and the water pump 20 are driven to decrease the coolant temperature without respect to an ignition switch. When the battery 14 is charged by a specified amount and the coolant temperature becomes lower than a specified value, the plug-in-charge control is terminated. The cooling fan 26 and the water pump 20 are stopped.

The charging condition of the battery 14 is denoted by SOC (state of charge).

$$SOC=Remaining\ charge/Full\ charge \times 100$$

According to the present embodiment, as shown in FIG. 4, the passage-switching valve 22 is controlled according to the warming-up state of the engine 11 and the driving mode of the vehicle. The passage-switching valve 22 switches between the coolant passage of the engine 11 and the bypass passage 21.

(a) When the driving mode is EV-mode and the engine 11 is before warming-up, the engine coolant temperature and the inverter coolant temperature are low (for example, 65° C.). The passage-switching valve 22 is switched to a normal position. The coolant flows through the coolant passage of the engine 11. The waste heat of the inverter 13 warms the engine 11.

(b) When the driving mode is EV-mode and the engine 11 is after warming-up, the engine coolant temperature is high (for example, 105° C.) and the inverter coolant temperature is low (for example, 65° C.). The passage-switching valve 22 is switched to a bypass position. The engine coolant does not flow through the coolant passage of the engine 11. Thus, after warming-up, the engine coolant temperature does not fall.

(c) When the driving mode is HV-mode and the engine 11 is before warming-up, the engine coolant temperature and the inverter coolant temperature are low (for example, 65° C.). The passage-switching valve 22 is switched to a normal position. The coolant flows through the coolant passage of the engine 11. The waste heat of the inverter 13 warms the engine 11.

(d) When the driving mode is HV-mode and the engine 11 is after warming-up, the engine coolant temperature and the inverter coolant temperature are high (for example, 105° C.). The passage-switching valve 22 is switched to a normal position. The coolant flows through the coolant passage of the engine 11, so that the engine 11 is cooled.

(e) When the vehicle is parked and the engine 11 is before warming-up, the engine coolant temperature and the inverter coolant temperature are low (for example, 65° C.). The passage-switching valve 22 is switched to the bypass position. The coolant does not flow through the coolant passage of the engine 11. The engine coolant temperature is maintained.

(f) When the vehicle is parked and the engine 11 is after warming-up, the engine coolant temperature and the inverter coolant temperature are high (for example, 105° C.). The passage-switching valve 22 is switched to the bypass position. The coolant does not flow through the coolant passage of the engine 11. Thus, after warming-up, the engine coolant temperature does not fall.

[Allowable-Current-Switching Control]

FIG. 5 is a flowchart showing an allowable-current-switching control which the ECU 27 executes. This allowable-current-switching control corresponds to an allowable-current controller. In step 101, the ECU 27 determines whether a current driving mode is EV-mode.

When the ECU 27 determines that the current driving mode is EV-mode, the procedure proceeds to step 102 in which the upper limit temperature "Tw" of the coolant is set to the upper limit temperature "Tev" for EV-mode. The upper limit temperature "Tev" for EV-mode is lower than the upper limit temperature "Thv" for HV-mode.

$$Tw=Tev(<Thv)$$

In this case, the ECU 27 controls the water pump 20 and the cooling fan 26 in such a manner that the coolant temperature does not exceed the upper limit temperature "Tw" (=Tev).

Then, the procedure proceeds to step 103 in which the allowable current "Iin" of the inverter 13 is set to the allowable current "Iev" (for example, 230A) for EV-mode. The allowable current "Iev" for EV-mode is larger than the allowable current "Ihv" for HV-mode.

$$Iin=Iev(>Ihv)$$

Then, the procedure proceeds to step 104 in which the allowable output "Pm" of the motor 12 is set to the allowable output "Pev" (for example, 70 kW) for EV-mode. The allowable output "Pev" for EV-mode is larger than the allowable output "Phv" for HV-mode. Pm=Pev (>Phv)

Meanwhile, when the ECU 27 determines that the current driving mode is not EV-mode, the procedure proceeds to step 105 in which the upper limit temperature "Tw" of the coolant is set to the upper limit temperature "Thv" (for example, 105° C.) for HV-mode. The upper limit temperature "Thv" for HV-mode is higher than the upper limit temperature "Tev" for EV-mode.

$$Tw=Thv(>Tev)$$

In this case, the ECU 27 controls the water pump 20 and the cooling fan 26 in such a manner that the coolant temperature does not exceeds the upper limit temperature "Tw" (=Thv).

Then, the procedure proceeds to step 106 in which the allowable current "Iin" of the inverter 13 is set to the allowable current "Ihv" (for example, 170A) for HV-mode. The allowable current "Ihv" for HV-mode is smaller than the allowable current "Iev" for EV-mode.

$$Iin=Ihv(<Iev)$$

Then, the procedure proceeds to step 107 in which the allowable output "Pm" of the motor 12 is set to the allowable output "Phv" (for example, 45 kW) for HV-mode. The allowable output "Phv" for HV-mode is smaller than the allowable output "Pev" for EV-mode.

$$Pm=Phv(<Pev)$$

When the driving mode is changed from EV-mode to HV-mode, the allowable current "Iin" of the inverter 13 may be gradually changed from the allowable current "Iev" for EV-mode to the allowable current "Ihv" for HV-mode. The allowable output "Pm" of the motor 12 may be gradually changed from the allowable output "Pev" for EV-mode to the allowable output "Phv" for HV-mode.

When the driving mode is changed from HV-mode to EV-mode, the allowable current "Iin" of the inverter 13 may be gradually changed from the allowable current "Ihv" for HV-mode to the allowable current "Iev" for EV-mode. The allowable output "Pm" of the motor 12 may be gradually changed from the allowable output "Phv" for HV-mode to the allowable output "Pev" for EV-mode.

[Plug-In-Charge Control]

FIG. 6 is a flowchart showing a plug-in-charge control which the ECU 27 executes. This control corresponds to a plug-in-charge controller. When the vehicle is connected to an external power source, the ECU 27 is ON without respect to a position of an ignition switch.

In step 201, the ECU 27 determines whether a plug-in-charge request occurs. When the answer is NO in step 201, the plug-in-charge control is terminated.

When the answer is YES in step 201, the procedure proceeds to step 202 in which the ECU 27 determines whether the SOC of the battery 14 is greater than or equal to a specified value.

When the answer is NO in step 202, the procedure proceeds to step 203 in which the battery 14 is charged (plug-in-charge). Then, the procedure proceeds to step 206 in which the cooling fan 26 and the water pump 20 are driven.

When the answer is YES in step 202, the procedure proceeds to step 204 in which the plug-in-charge of the battery 14 is stopped. Then, the procedure proceeds to step 205 in which the ECU 27 determines whether the inverter coolant temperature is lower than or equal to a specified value (for example, 65° C.). When the answer is NO, the procedure proceeds to step 206 in which the cooling fan 26 and water pump 20 are driven.

When the answer is YES in step 205, the procedure proceeds to step 207 in which the ECU 27 determines that the plug-in-charge of the battery 14 is terminated. Then, the procedure proceeds to step 208 in which the cooling fan 26 and the water pump 20 are stopped.

According to the above described embodiment, the engine 11 and the inverter 13 are cooled by the engine cooling system 23 only. Thus, it is unnecessary to independently provide a cooling system for an engine and another cooling system for an inverter.

When the driving mode is EV-mode, the engine 11 is not driven and the engine 11 generates no combustion heat. When the driving mode is EV-mode, the upper limit temperature of the coolant is decreased. Thus, the coolant temperature is decreased and the temperature of the inverter 13 is also decreased. When the temperature of the inverter 13 is decreased, the allowable current of the inverter 13 can be increased. When the driving mode is HV-mode, the allowable current of the inverter 13 is increased and the allowable output of the motor 12 is increased. Thus, a large-sized motor 12 and a large-sized inverter 13 are unnecessary.

Moreover, according to the present embodiment, the cooling fan 26 is driven without respect to the position of the ignition switch. When the plug-in-charge is conducted even after HV-mode driving, the cooling fan 26 is driven by the external power source, so that the temperature of the inverter 13 can be decreased. The allowable current of the inverter 13 can be increased and the allowable output of the motor 12 can be increased.

When the SOC of the battery 14 is greater than the specified value and the cooling fan 26 is stopped, it is likely that the coolant temperature is not decreased enough.

According to the present embodiment, when the SOC of the battery 14 is larger than a specified amount and the coolant temperature becomes lower than a specified value, it is determined that the plug-in-charge control is terminated to stop the cooling fan 26. Until the coolant temperature is decreased enough, the cooling fan 26 is driven. Thus, the coolant temperature can be surely decreased.

Moreover, according to the present embodiment, the passage-switching valve 22 is provided. The passage-switching valve 22 is controlled according to the warming-up state of the engine 11 and the driving mode of the vehicle (EV-mode or HV-mode). The passage-switching valve 22 switches between the coolant passage of the engine 11 and the bypass passage 21. Thus, the coolant passage can be switched to the proper coolant passage according to the current engine condition and the current driving mode.

The bypass passage 21 and the passage-switching valve 22 are arranged downstream of the water pump 20. Thus, even if the passage-switching valve 22 switches the passage to the bypass passage 21, the coolant is circulated between the inverter 13 and the radiator 15 to cool the inverter 13.

Figure 7:
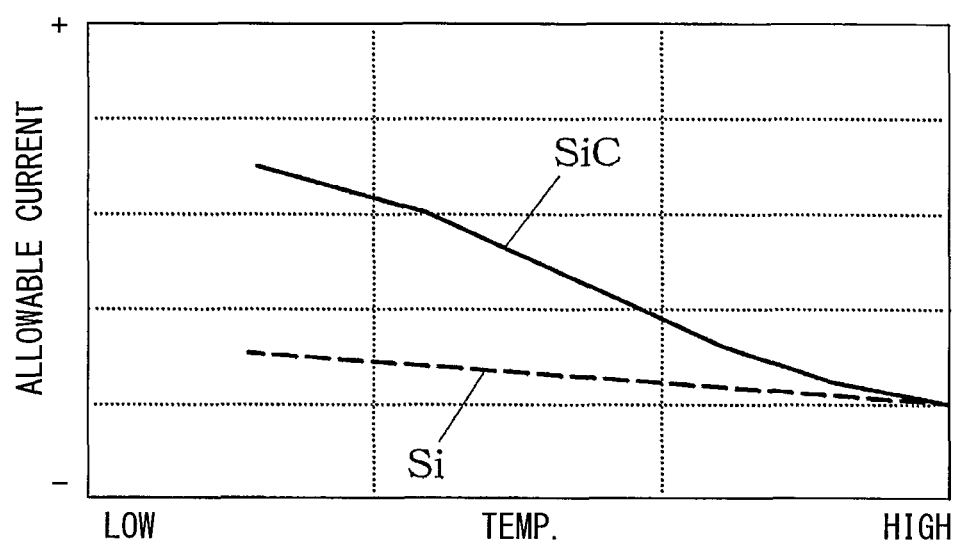
FIG. 7 is a chart showing relationship between an inverter temperature and an allowable current.

Moreover, according to the present embodiment, the switching circuit of the inverter 13 has the SiC switching element. The SiC switching element has lower resistance than Si switching element. As shown in FIG. 7, the allowable current of the inverter 13 having SiC element is larger than the allowable current of the inverter 13 having Si element.

However, in the present disclosure, other than SiC switching element can be used.

In the above embodiment, when the plug-in-charge is conducted, the cooling fan 26 is always driven. However, only when the coolant temperature is higher than a specified value, the cooling fan 26 may be driven.

In the above embodiment, when the SOC of the battery 14 is greater than a specified value and when the coolant temperature becomes lower than a specified value, the cooling fan 26 is stopped. However, when the coolant temperature becomes lower than a specified value, the cooling fan 26 may be stopped. Alternatively, when the SOC of the battery 14 becomes larger than a specified value, the cooling fan 26 may be stopped.

The passage-switching valve 22 may be provided at an outlet of the bypass passage 21. The water pump 20 is provided in the first coolant pipe 17.

What is claimed is:

1. A controller for a hybrid vehicle, comprising:
    an engine and a motor for driving a vehicle in an EV-mode configured to drive the vehicle with only the motor and an HV-mode configured to drive the vehicle with the motor and/or the engine;
    an inverter driving the motor;
    a battery supplying electric power to the motor through the inverter, the battery being charged by an external power source;
    a cooling system for circulating a coolant between the engine, the inverter and a radiator in order to cool the engine and the inverter, and
    an allowable-current controller which varies an upper limit temperature of the coolant, an allowable current of the inverter, and an allowable output of the motor, according to the driving mode during the EV-mode, wherein in the EV-mode, the vechicle is driven only by the motor, and the battery is sufficiently charged and the engine is stopped.

2. A controller for a hybrid vehicle according to claim 1, further comprising:
    an electric cooling fan generating cooling air; and
    a plug-in-charge controller driving the electric cooling fan during a plug-in-charge without respect to a position of an ignition switch.

3. A controller for a hybrid vehicle according to claim 2, wherein when the battery is charged more than or equal to a specified value and the temperature of the coolant is lower than or equal to a specified value, the plug-in-charge controller stops the cooling fan.

4. A controller for a hybrid vehicle according to claim 1, wherein the cooling system is provided with a passage-switching valve which switches between a coolant passage of the engine and a bypass passage, so that the coolant flows through the coolant passage of the engine or the coolant flows through a bypass passage.

5. A controller for a hybrid vehicle according to claim 4, wherein the bypass passage and the passage-switching valve are arranged downstream of a water pump which circulates the coolant.

6. A controller for a hybrid vehicle according to claim 1, wherein the inverter has a SiC switching element.

7. A controller for a hybrid vehicle according to claim 1, wherein an upper limit temperature of the coolant for the EV-mode is lower than an upper limit temperature of the coolant for the HV-mode.

8. A controller for a hybrid vehicle according to claim 1, wherein an allowable current of the inverter for the EV-mode is larger than an allowable current of the inverter for the HV-mode.

* * * * *